United States Patent [19]
Hall

[11] 3,808,697
[45] May 7, 1974

[54] INCLINOMETER
[76] Inventor: Earl B. Hall, 163 Carte Ramon, Greenbrae, Calif. 94904
[22] Filed: Jan. 28, 1970
[21] Appl. No.: 6,515

Related U.S. Application Data
[63] Continuation-in-part of Ser. No. 729,869, April 22, 1968, abandoned, which is a continuation-in-part of Ser. No. 649,938, June 29, 1967, abandoned.

[52] U.S. Cl. .............................................. 33/312
[51] Int. Cl. ...................... G01c 9/16, E21b 47/022
[58] Field of Search ........................ 33/205, 205.5 E

[56] References Cited
UNITED STATES PATENTS
| | | | |
|---|---|---|---|
| 3,339,419 | 9/1967 | Wilcox | 73/517 R |
| 2,190,950 | 2/1940 | Potapenko | 33/205 |
| 2,869,851 | 1/1959 | Sedgefield et al. | 261/1 |
| 3,400,464 | 9/1968 | Karol | 33/205 |

Primary Examiner—Louis R. Prince
Assistant Examiner—Steven L. Stephan
Attorney, Agent, or Firm—Owen, Wickersham & Erickson

[57] ABSTRACT

An inclinometer moves along a path having an attitude orientater. Its housing has a follower such as wheels engaging the attitude orientater, as in grooves. A pair of linear servo-accelerometers are mounted horizontally and perpendicular to each other in the housing. A detector determines the amount of departure from horizontal of each accelerometer. In some forms there is a third accelerometer of the type indicating the amount of departure from vertical to the longitudinal axis of the inclinometer.

2 Claims, 19 Drawing Figures

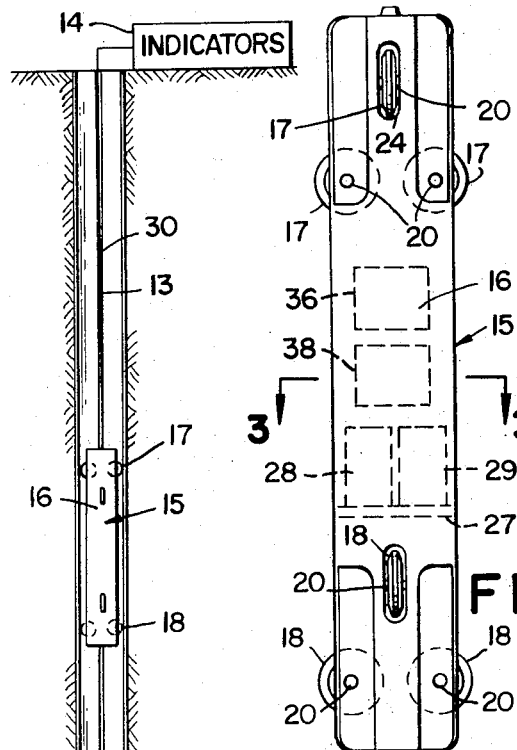
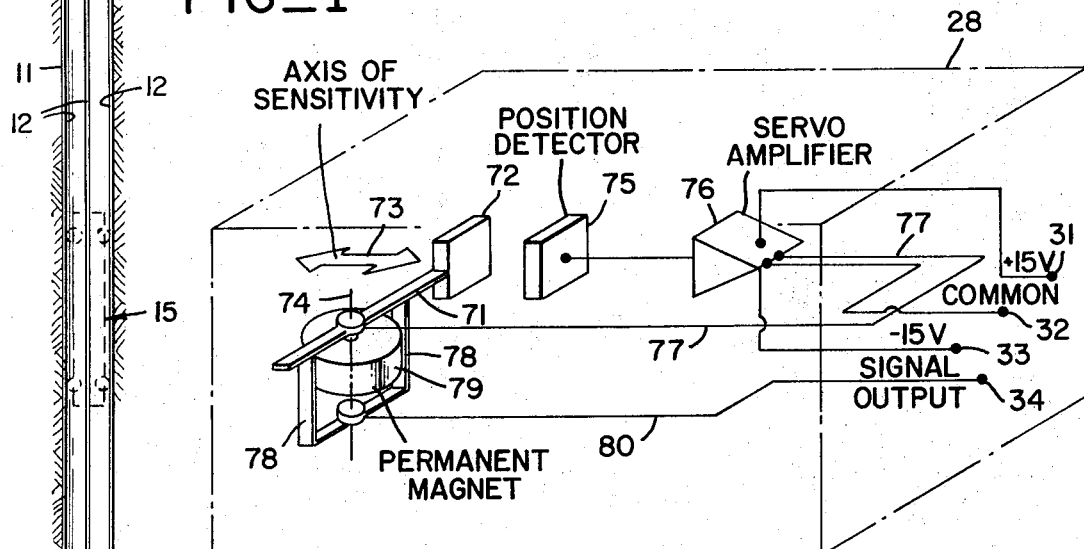

PATENTED MAY 7 1974 3,808,697
SHEET 2 OF 6
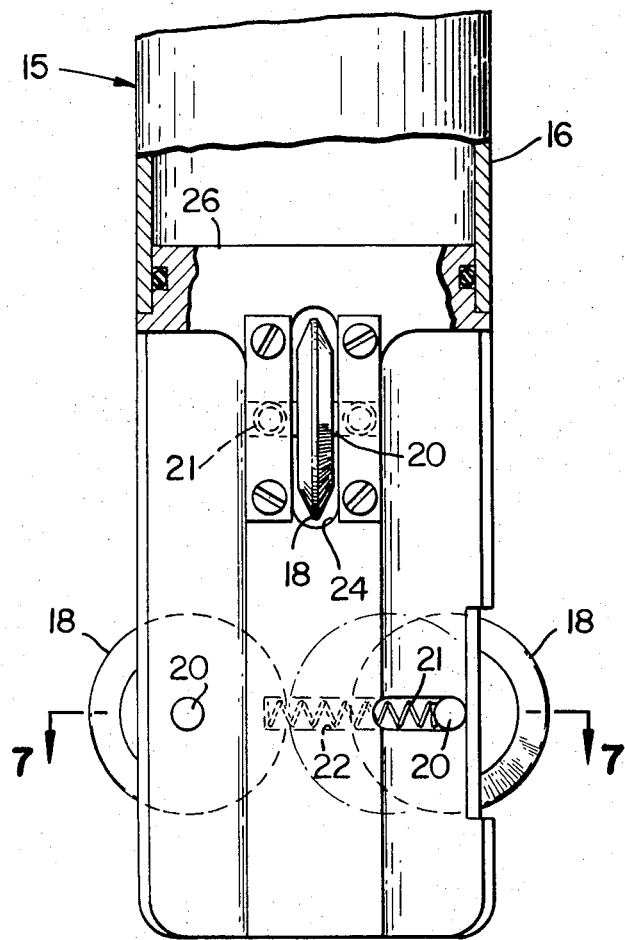
FIG_6
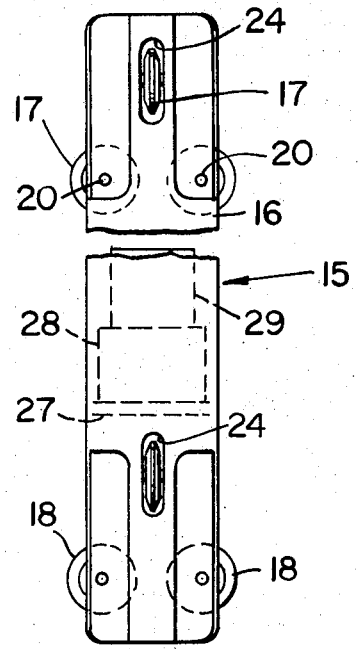
FIG_5
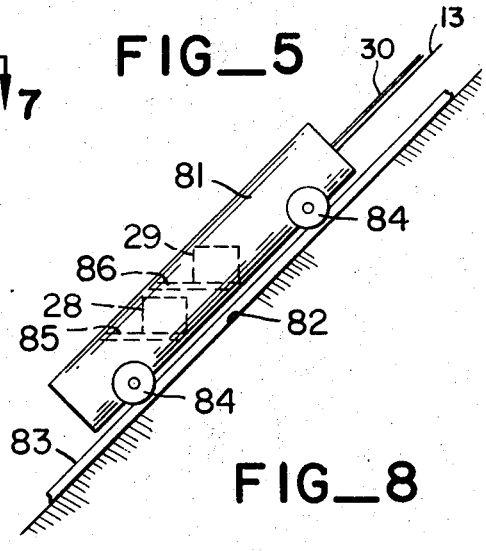
FIG_8
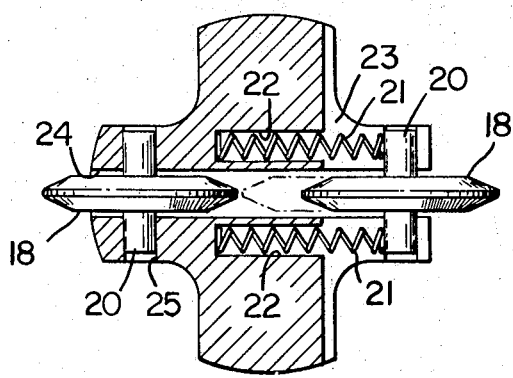
FIG_7
INVENTOR.
EARL B. HALL
Owen, Wickersham & Erickson
ATTORNEYS

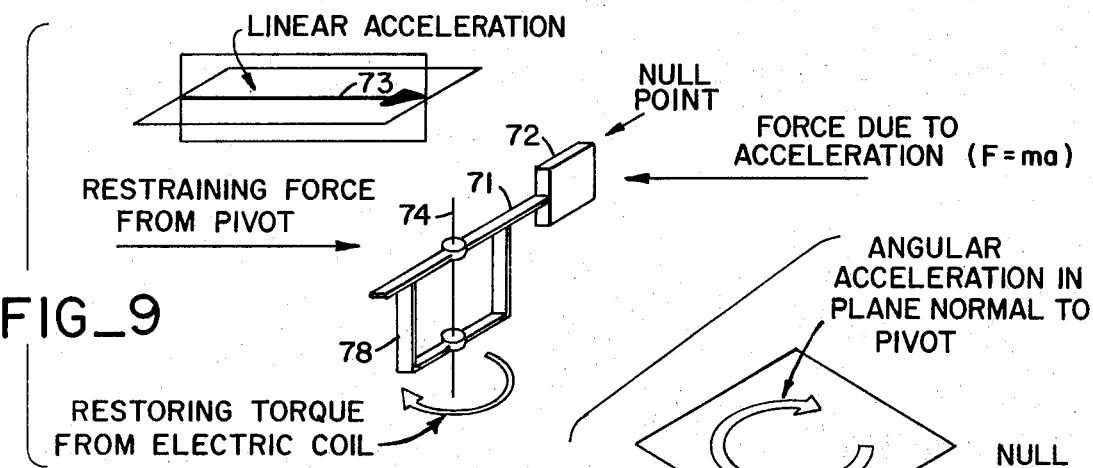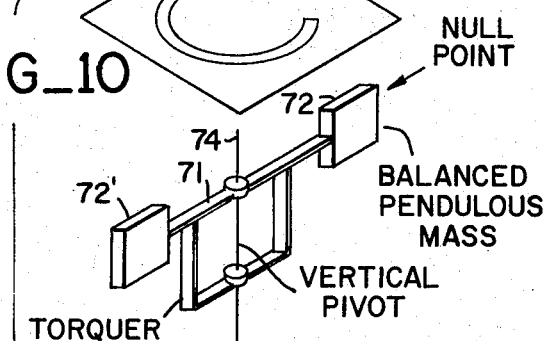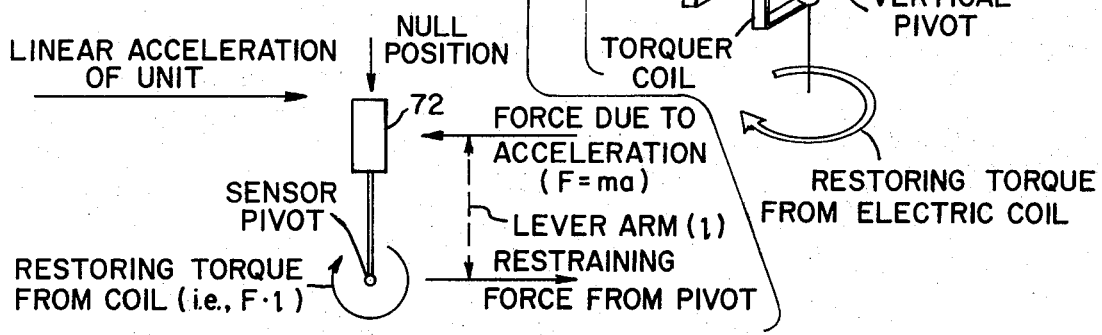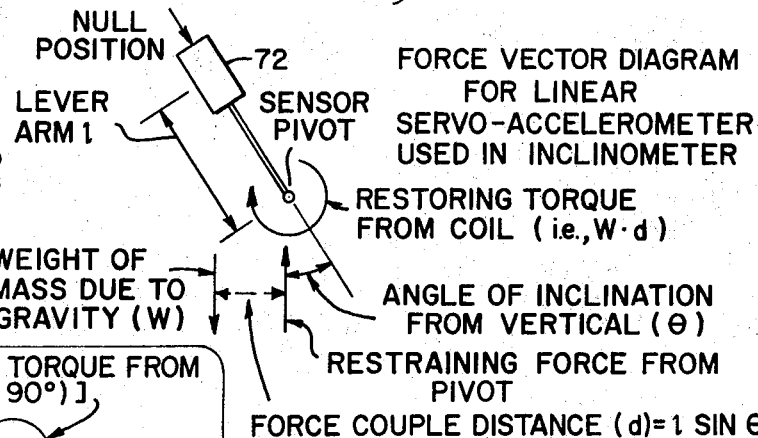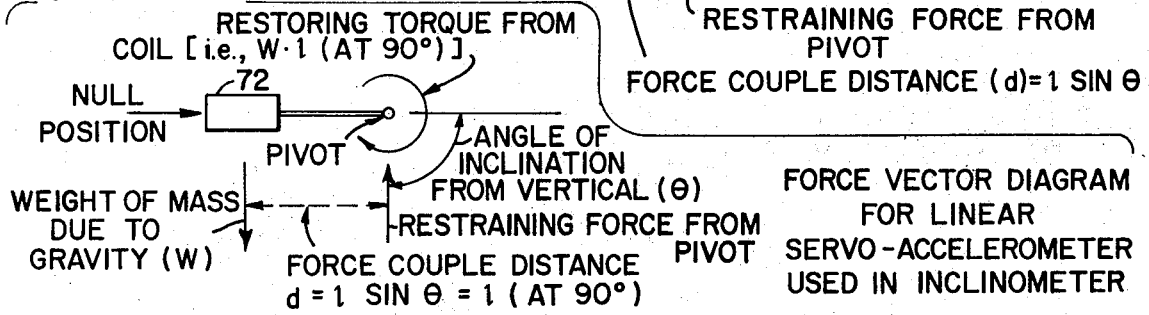

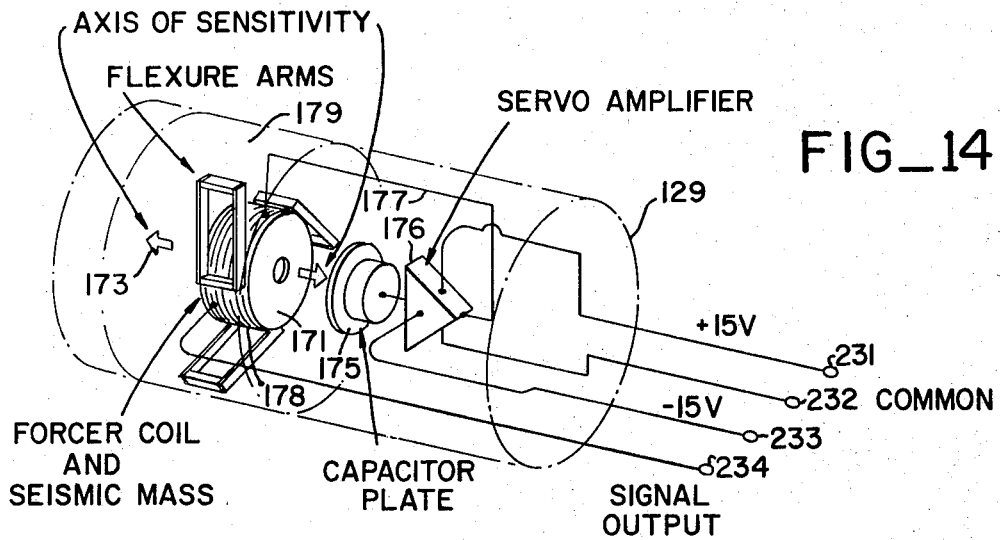
FIG_14
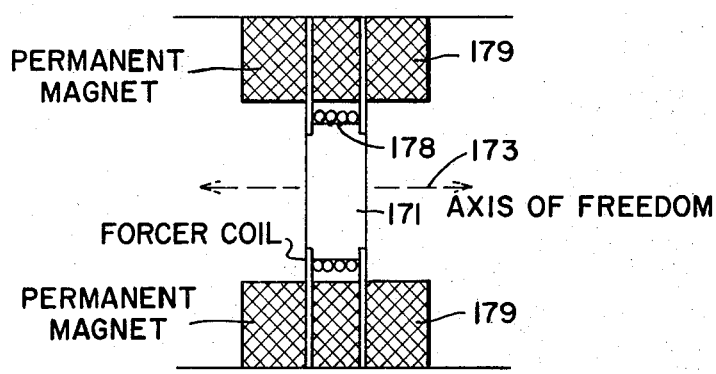
FIG_15
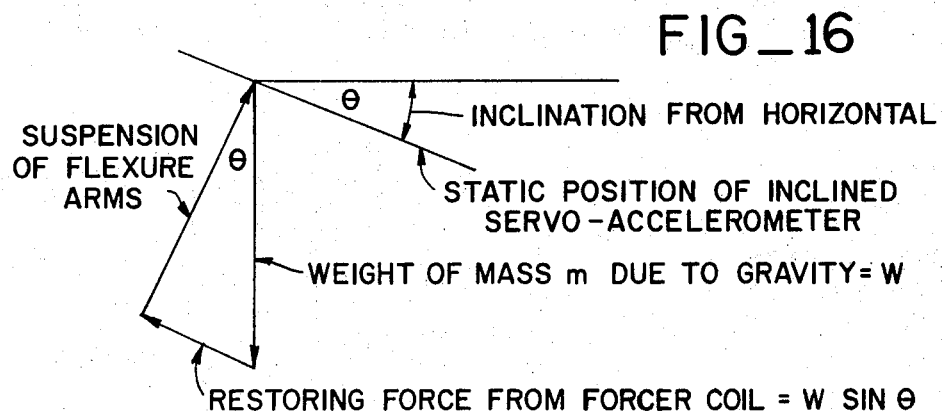
FIG_16
VECTOR DIAGRAM OF NON-PENDULOUS SERVO-ACCELEROMETER WHEN USED IN AN INCLINOMETER

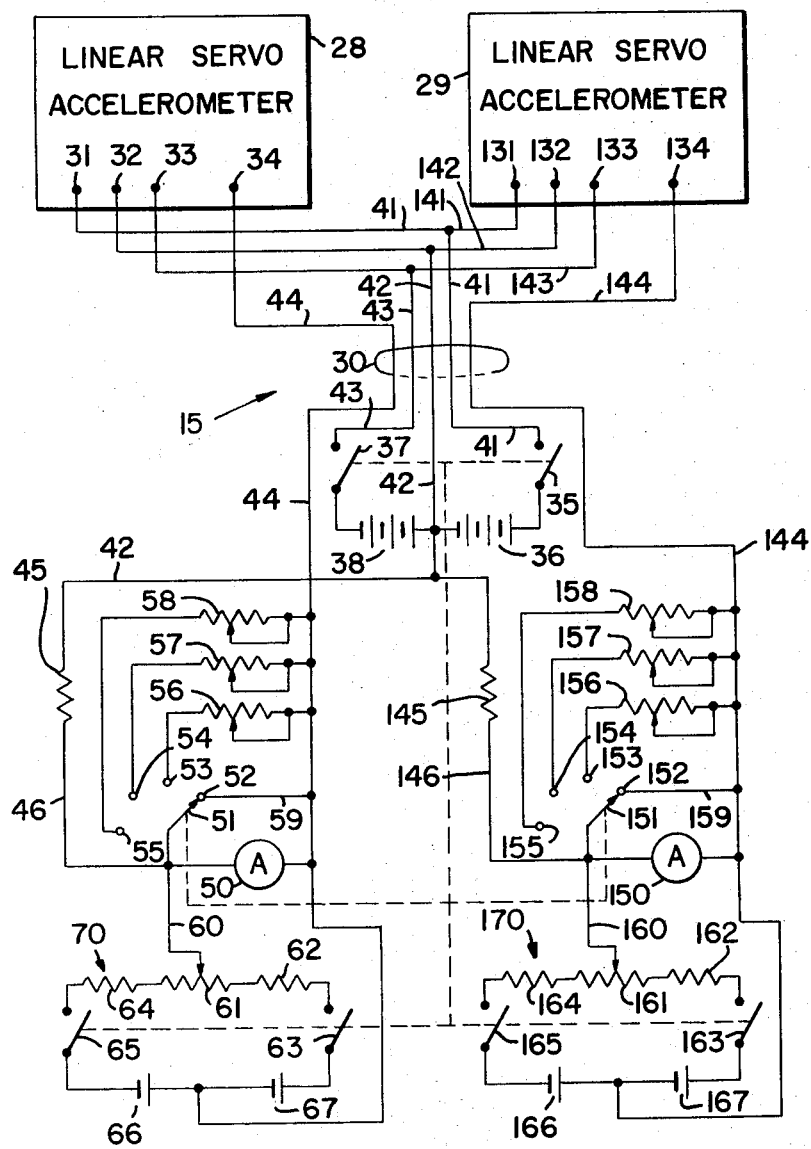
FIG_17

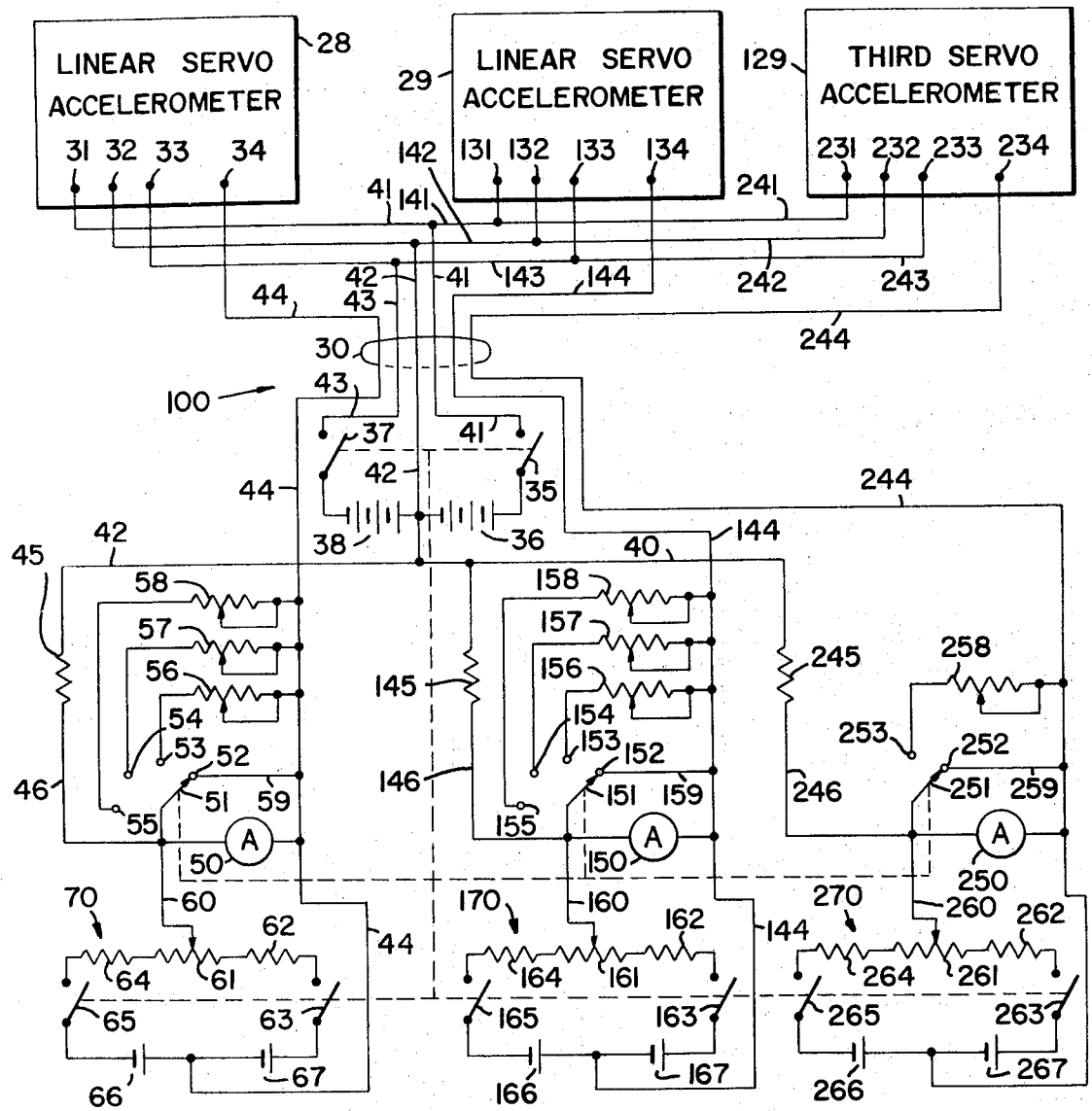
FIG_19
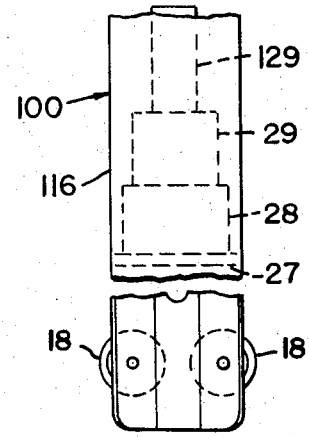
FIG_18
*INVENTOR.*
EARL B. HALL
ATTORNEYS

INCLINOMETER

This application is a continuation-in-part of application Ser. No. 729,869, filed Apr. 22, 1968, now abandoned which was a continuation-in-part of application Ser. No. 649,938, filed June 29, 1967, now abandoned.

This invention relates to an improved inclinometer, for measuring how much a slope departs from vertical or horizontal, relative to the earth's gravitational field.

The present invention is particularly useful for measuring incline from true vertical in borings and casings of drilled wells and for measuring the inclination of walls and other generally vertical or horizontal surfaces, wherever accurate measurement of incline is important.

Heretofore, the accuracy of inclinometers has not been sufficient for many purposes, and one object of the present invention is to provide an extremely accurate, yet simple inclinometer, which will measure very small departures from the vertical and very small differences in such inclines. It is able to measure thirty seconds of arc, or a slope of about one inch in about five hundred feet, so that it is an order of magnitude more sensitive than slope-measuring devices heretofore in use, i.e., more than ten times as sensitive.

Basically, the invention comprises a pair of linear servo-accelerometers mounted on a normally horizontal plane and at right angles to each other, in combination with circuitry enabling detection of small departures from the truly horizontal plane of each linear servo-accelerometer. The departures of the linear accelerometer from the horizontal plane correspond to departures of their line of sensitivity from the vertical line of gravitational force, considered as the vertical axis perpendicular to the horizontal plane. The normally horizontal plane with its linear servo-accelerometers is mounted within a housing, which is lowered into a casing or along a slope to be measured, the housing being suitably keyed to the casing or other slope to preserve proper orientation of the instrument. Hence, the departure from horizontal in each of the two mutually perpendicular directions along which the two linear servo-accelerometers are mounted is a measure of the vertical inclination of the casing or boring through which (or the other slope along which) the assembly is moved.

In addition, the invention may comprise a third servo-accelerometer mounted as later described for measuring the departure of the longitudinal axis of the inclinometer from the vertical line of gravitational force. This is especially useful when measuring inclinations from the vertical direction greater than about 6° and when the line of sensitivity of either of the two normally horizontal linear servo-accelerometers lies outside of the vertical plane containing the longitudinal axis of the inclinometer. This third servo-accelerometer serves to resolve the vectors established from the two normally horizontal linear servo-accelerometers.

Other objects and advantages of the invention will appear from the following description of a preferred form of the invention.

In the drawings:

FIG. 1 is a view in elevation and in section of a vertically bored hole with a casing in which is suspended and keyed an inclinometer embodying the principles of the invention. In broken lines, the inclinometer is shown in a lower position.

FIG. 2 is an enlarged view in elevation of the inclinometer of FIG. 1.

FIG. 3 is an enlarged view in section taken along the line 3—3 in FIG. 2, adding the casing and grooves from FIG. 1 and showing the horizontal plane supporting two linear servo-accelerometers at right angles to each other.

FIG. 4 is a simplified view in perspective, largely diagrammatic of a linear servo-accelerometer of the type used twice in FIG. 3.

FIG. 5 is a fragmentary view in elevation of a modified form of inclinometer in which the two linear servo-accelerometers lie one above the other; the view is broken in the middle to conserve space.

FIG. 6 is an enlarged fragmentary view of the lower part of the FIG. 5 device, partly broken away to show interior portions and showing one of the lower wheels in two positions, an extreme outer position in solid lines and an extreme inner position in broken lines.

FIG. 7 is a view in section taken along the line 7—7 in FIG. 6, again showing the movable wheel in two extreme positions.

FIG. 8 is a view in side elevation of a modified form of the invention as adapted to measuring deviation from a slope.

FIG. 9 is a diagrammatic view in perspective of a typical arrangement of a pendulous type of linear servo-accelerometer at its force-balanced or null position.

FIG. 10 is a similar view of a typical arrangement of a pendulous type of angular servo-accelerometer at its torque-balanced or null position.

FIG. 11 is a force vector diagram of a pendulous type of linear servo-accelerometer when used as a linear accelerometer.

FIG. 12 is a force vector diagram of the linear servo accelerometer of FIG. 11 when used as an inclinometer at a slight inclination.

FIG. 13 is a view like FIG. 12 where the linear servo-accelerometer is vertical and the inclinometer is used in a horizontal position.

FIG. 14 is a simplified, largely diagrammatic view in perspective of a typical non-pendulous type of linear servo-accelerometer.

FIG. 15 is a diagrammatic view of the servo-accelerometer of FIG. 14 in its balanced or null position.

FIG. 16 is a vector diagram of the servo-accelerometer of FIG. 14 when used as an inclinometer.

FIG. 17 is a preferred electrical circuit diagram of the inclinometer of FIGS. 1–3.

FIG. 18 is a view similar to FIG. 2 of a modified form of device employing a third servo-accelerometer in addition to the two linear servo-accelerometers, to measure the deviation from vertical in any direction of the longitudinal axis of the inclinometer.

FIG. 19 is a circuit diagram for a device of the type of FIG. 18.

As shown in FIG. 1, an important use of the invention is to measure any departure from vertical in a nominally vertical hole 10, which is preferably provided with a suitable casing 11 having four linear grooves 12 or other suitable keying means. There may be more or fewer grooves 12. Electric leads 13 pass from an indicator panel 14 at ground level to an inclinometer 15.

An inclinometer 15 of this invention may then comprise a generally tubular housing 16 having an upper set of wheels or rollers 17 and a lower set of wheels or rollers 18. All of the wheels 17, 18 engage in the grooves 12 and thereby maintain the orientation of the unit 15 relative to the casing 11. By way of example, four wheels 17 and four wheels 18 may be provided. Corresponding wheels of the sets are preferably spaced apart by exactly the same distance, e.g., one foot from each wheel 17 to its corresponding wheel 18. Each wheel is preferably supported for free rotation (see FIGS. 3, 6, and 7) on an axle 20. Two axles 20 of each set of four are supported by a pair of springs 21 (see FIGS. 6 and 7) that are seated in bores 22. These axles 20 move in slots 23, while the wheels 17, 18 extend out through openings 24. The other two axles 20, one of each pair, are supported for rotation in a bore 25. Thus, one wheel 17, 18 of each pair is spring-urged and yieldable, and the other one is not. Snug engagement of the wheels 17 and 18 in the grooves 12 is thereby maintained. As a result, the housing 16 cannot turn inside the casing 11, and an observer at ground level knows the orientation of the housing 16.

Inside the housing 16 is a normally horizontal platform 27 on which, in the form of the invention shown in FIGS. 2 and 3, are mounted two linear servo-accelerometers 28 and 29, both of which are preferably quite parallel with respect to the plane of the platform 27, which is itself mounted to be perpendicular to the housing 16. Minor adjustments can be made in the electrical circuit (as will be shown) to the readings to adjust for minor departures from parallel mounting. The linear servo-accelerometers 28 and 29 are also mounted exactly perpendicular to each other, great care being taken in this mounting. The housing 16 may be suspended by a cable 30 which also carries depth measuring indicia and the two sets of electric leads 13 for each of the servo-accelerometers, which goes to an indicator 14 at the top. The use of batteries in the device reduces the number of such leads in each set. Where reduction in the number of leads is not significant, the batteries need not be located in the housing 16 but may be with the indicators at the opposite end of the cable 30 from the housing 16. In either case, the leads 13 may also constitute the cable 30.

The linear servo-accelerometers 28 and 29 are solid-state, direct-current, closed-loop, force-balance accelerometers. The linear servo-accelerometers 28 and 29 may be of the pendulous type, shown diagrammatically in FIG. 4. They are force-balanced devices operating on a torque balance principle. Each one has an unbalanced pendulous device 71 with an unbalanced mass 72, since they are used for measuring linear acceleration, in contrast to the balanced pendulous devices that detect angular acceleration (Cf., FIGS. 9 and 10). When linear acceleration along an axis of sensitivity 73 is applied to and acts on the unbalanced system 71 within the linear servo-accelerometer 28 or 29, it produces a rotational effect, expressed as a tendency of the pendulous mass 72 to rotate about its vertical axis 74. However, in fact, no rotation really takes place, for the rotational effect is immediately sensed by a capacitive position detector 75 and develops an electrical signal; the signal, amplified, in turn controls an electronic servo-amplifier 76 which sends a direct current of proper polarity by a lead 77 into an electric torque-generating coil 78 operating in a magnetic field of a permanent magnet 79 and connected to the pendulous mass 72, in fact forming part of the pendulous system 71; the resultant restoring torque maintains the seismic system in its null position. Instead of relying on the amount of rotational displacement of the pendulous mass 72 to indicate linear acceleration, the device prevents that displacement from taking place. As shown in FIG. 9, the current in the restoring coil 78 required to achieve this null condition is directly proportional to the acceleration or force ($F = ma$) applied to the pendulous mass 72. By way of contrast, FIG. 10 shows diagrammatically an angular servo-accelerometer having a mass 72' balancing the mass 72 in its balanced system 71'; such a device is sensitive, not to linear acceleration but to angular acceleration in a plane normal to the pivot axis 74, and therefore such a device cannot be used as the linear servo-accelerometer 28 or 29 in this invention.

FIG. 11 is a force diagram for the linear servo-accelerometer 28 or 29 when used as a linear accelerometer. When used in the present invention, however, the force diagram for the linear servo-accelerometer is somewhat different, as best seen in FIGS. 12 and 13. As shown there, when used in an inclinometer, the force couple distance varies as the sine of the angle of inclination, which the instrument 15 of this invention assumes as it traverses the casing. Hence, the magnitude of the current required to maintain the force-balanced condition due to gravitational influence expresses the tilt or angle of inclination of the inclinometer 15, and this current is what is displayed directly on the indicator at the panel 14. These linear servo-accelerometers are well known and may be purchased as units. For example, the device may be an LSB linear servo-accelerometer made by Schaevitz Engineering.

The circuit diagram, FIG. 17 shows how the linear servo-accelerometers 28 and 29 may be connected in this particular invention to provide the inclinometer. For convenience, the connections of the accelerometer 28 are described. The connections for the accelerometer 29 are the same and are shown by the reference numerals exactly one hundred higher.

The linear servo-accelerometer 28 has four terminals 31, 32, 33, and 34, and the linear servo-accelerometer 29 has four corresponding terminals 131, 132, 133, and 134. The output signal from the coil 78 in the linear servo-accelerometer 28 is conducted by a lead 80 to the terminal 34. The terminals 31, 32, and 33 are used for input to the servo-amplifier 76. The terminal 31 is connected by a lead 41 through a normally open switch 35 to the positive terminal of a battery 36. The terminal 33 is connected by a lead 43 through a normally open switch 37 (which is ganged with the switch 35) to the negative terminal of a battery 38. The negative terminal of the battery 36 is connected to the positive terminal of the battery 38 and to a common line 42, which is connected to the terminal 32. The common line 42 is also connected to an isolating resistor 45. The fourth or output signal terminal 34 of the accelerometer 28 is connected to a line 44. The terminals 131, 132, and 133 of the linear servo-accelerometer 29 are connected by leads 141, 142, and 143 to the leads 41, 42, and 43, and the terminal 134 is connected to a lead 144. The common line 42 is connected to an isolating resistor 145.

The isolating resistor 45, which is connected to the common line 42 is connected at its other end by a lead 46 to an ammeter 50, and the isolating resistor 145 is similarly connected by a lead 146 to an ammeter 150.

A switch 51 shunts across the ammeter 50 via an "off" contact 52 directly from the output signal lead 44, or else is moved to any of contacts 53, 54, or 55, passing then to the lead 44 through one of the potentiometers 56, 57, or 58 to give, for example, a 2° full scale reading for a 25-0-25 microammeter 50, or a 5° full scale reading or a 10° full scale reading. Similarly, a switch 151 shunts across the ammeter 150 through an "off" contact 152 directly from the output signal lead 144, or else is moved to one of contacts 153, 154, or 155, where a potentiometer 156, 157, or 158 enables a 2°, 5°, or 10° full scale reading.

When the device is operating, the battery 36 supplies a voltage of about +15 volts to the terminals 31 and 131, and the battery 38 supplies a voltage of about −15 volts to the terminals 33, and 133, the terminals 32, and 132 being at 0 voltage. These voltages and common are thereby applied to the servo amplifiers 76, so that both linear servo-accelerometers are energized. The switch 51 either shunts across the ammeter 50 or is moved to one of the contacts 53, 54, or 55 to select a proper ammeter scale. Minor adjustments may be made by the potentiometers 56, 57, and 58 to assure that the scales are correct and indicating properly. A scale corresponding to the degree of incline expected is selected by positioning the switch 51 to one of the three terminals 53, 54, or 55, and if the selected scale is found to be improper, the switch arm 51 is moved to a different one of these terminals. The amount of deflection of the ammeter 50 can be gauged directly in incline, or it can easily be transposed thereto by the use of a suitable table.

The zero point of each ammeter 50 and 150 may be adjusted through a circuit 70 or 170, which are identical in nature, though the circuit values may vary. This compensates for minor inaccuracies in mounting. In each of them a lead 60 (or 160) from the load side of the ammeter goes to a voltage divider 61 (or 161) which sends one branch through a resistor 62 (or 162) to normally open switch 63 (or 163) and another branch through a resistor 64 (or 164) to a normally open switch 65 (or 165). The lead 44 or 144 is connected in between two batteries 66 (or 166) and 67 (or 167) to the other side of the switch 63 (or 163) and 65 (or 165).

As shown in FIG. 5, the two accelerometers 28 and 29 need not be on the same horizontal level, but may be stacked one above the other. Both are then horizontal; the fact that one is higher than the other does not matter. The batteries 36 and 38 may be similarly stacked to take up minimum width, enabling the use of small casings 11.

As shown in FIG. 8, the device may be used to measure deviation from regular slopes. Here a cartridge 81 carries the inclinometer up and down a slope 82 over rails 83 by means of wheels 84. The two linear servo-accelerometers 28, 29 may be kept approximately horizontal by having them set on one or more shelves 85, 86 that are horizontal relative to the standard inclination intended for the slope 82. Or, the linear servo-accelerometers 28 and 29 may be provided with housings that match the slope of the cartridge 81, so long as their sensing devices are kept normal to the force of gravity. Once again, a cable 30 carries the leads 13 to the indicator 14.

Servo-accelerometers of the non-pendulous type may also be used in this invention when they are "force-balanced" devices employing a small seismic mass 171 so suspended by flexure arms 172 that it is free to move only along one axis 173 relative to its mounting case. Such an accelerometer 129 is shown in FIG. 14. Linear forces parallel to this axis 173 acting upon the seismic mass 171 tend to cause displacement away from its "null" position. Such displacement tendencies are immediately sensed by a capacitor plate 175 and fed to an electronic servo-amplifier 176 that in turn sends a direct current of the proper polarity and magnitude by a lead 177 to a space-wound forcer coil 178 that constitutes part of the seismic mass 171. This current flowing through the forcer coil 178 operating in the magnetic field of a permanent magnet 179 (see FIG. 15) causes a restoring force to act upon the mass 171 and maintains in it the null or force-balanced position. This restoring current is directly proportional to the linear force or acceleration acting upon the seismic mass 171 and varies as the sine of the angle of inclination when used as an inclinometer. A typical non-pendulous servo-accelerometer 129 is Model 305A manufactured by Kistler Instrument Corporation. FIG. 16 presents a force vector diagram for the servo-accelerometer 129 when it is employed as or in an inclinometer.

Either type of servo-accelerometer (i.e., pendulous or non-pendulous) can be used in the inclinometer of this invention. At this state of the art, the pendulous type of linear servo-accelerometer is best suited for detecting the *x* and *y* directions (mounted on the normally horizontal plane) due to its especially high sensitivity, while the non-pendulous type is best suited for use as the axial unit to measure the *z* direction due to its case configuration, absence of pivotal effects and inability to respond to angular acceleration. Electrical connections are the same for both types of accelerometers employed in the inclinometer of this invention; the variation in output signals are accommodated by small adjustments in the calibrating potentiometers contained in the indicating unit.

FIG. 18 shows a modified form of inclinometer 100 having, in addition to the two linear servo-accelerometers 28 and 29, a third servo-accelerometer 129, to measure the magnitude of inclination to the vertical force of gravity. This third servo-accelerometer 129 may be mounted in the housing 116 just above the other servo-accelerometers 28 and 29 and be so placed that the axis 173 is parallel to the longitudinal (generally normally vertical) axis of the inclinometer. This structure becomes important when the linear servo-accelerometers 28 and 29 are operating at an inclination well away from vertical and when the normally horizontal servo-accelerometers 28 and 29 are in a position which lies well out of the vertical plane through the inclinometer's longitudinal axis. Then, the linear servo-accelerometers 28 and 29 can still help with quadrant location of the coordinates, while the servo-accelerometer 129 still gives accurate inclination magnitudes. The cable 30 again gives accurate distance measurement.

FIG. 19 shows a circuit for the inclinometer of FIG. 9. The third servo-accelerometer 129 has four terminals 231, 232, 233, 234, corresponding to the terminals 31, 32, 33, and 34 of the linear accelerometer 28, and the terminals 231, 232, and 233 are connected by leads 241, 242, and 243 to the leads 41, 42, and 43. The terminal 234 is connected to a lead 244. An isolating resistor 245 corresponds to the resistor 45, and a lead 246 to the lead 46. An ammeter 250 corresponds to the ammeter 50, and is shunted by a switch 251 from a terminal 252. The switch 251 may be closed against a contact 253 that leads from the lead 244 through a potentiometer 254. The third servo-accelerometer 129 requires only one range of sensitivity, and the meter 250 may be a straight 0–50 microammeter. The zero point of the ammeter 250 may be adjusted through a circuit 270 like the circuit 70 which is used for the same purpose, having lead 260, voltage divider 261, resistors 262 and 264, switches 263 and 265, and batteries 266 and 267.

In the inclinometer 15, the linear servo-accelerometers 28 and 29 are thus mounted so that the ammeter 50 expresses a current value that may be calibrated to be read directly in angles of inclination away from the X axis, while the ammeter 150 may be calibrated to be read directly in angles of inclination away from the Y axis. The current for each one is actually an expression of L sin θ (see FIGS. 12 and 13), but calibration may remove the term L and convert the sine to the angle.

As the angles get large, the linear servo-accelerometers 28 and 29 are less reliable for magnitude but are still accurate as to quadrant. Then the servo-accelerometer 129 may be used, as shown to give more accurate readings of the magnitude — though no direction of divergence is shown by the servo-accelerometer 129 alone. It is mounted with the axis 173 longitudinal with respect to the axis of the inclinometer 100 and shows when the inclinometer 100 is tilted and how much is the degree of inclination to the vertical force of gravity, but the direction of the inclination, is shown by the linear servo-accelerometers 28 and 29.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. An inclinometer for use along a path having attitude orientation means, including in combination:
    a housing having follower means engaging said attitude orientation means,
    a pair of solid-state, direct current, force-balance linear servo-accelerometers, mounted on a normally horizontal plane and perpendicular to each other in said housing, with their axes of sensitivity normally horizontal and perpendicular to each other, each having a mass that tends to be displaced from a force-balanced position by inclination of its axis away from horizontal and having electrical means for restoring said mass to its force-balanced position and means for signaling the amount of electrical current used to achieve force balance at each instant,
    means for supplying each said servo-accelromter with direct current, so that departure from horizontal of its axis of sensitivity is overcome by electrical current supplied to said electrical means, and
    two indicator means outside said housing, each connected electrically to one said means for signaling for indicating the instantaneous amount of the force-balancing electrical current, from which the inclination of each linear servo-accelerometer is determined,
    a third solid-state, direct current, force-balance servo-accelerometer mounted in said housing with its axis of sensitivity perpendicular to the axes of sensitivity of said pair of linear servo-accelerometers, said third servo-accelerometer having a mass that tends to be displaced from a force-balanced position by inclination of its axis away from vertical and having electrical means for restoring that said mass to its force-balanced position and means for signaling the amount of electrical current used to achieve force balance at each instant,
    means for supplying said third servo-accelerometer with direct current, so that departure from vertical of its axis of sensitivity is overcome by electrical current supplied to said electrical means, and
    third indicator means outside said housing and connected to said third accelerometer's means for signaling for indicating the instantaneous amount of the force-balancing electrical current, from which the inclination from vertical of said third servo-accelerometer is determined.

2. An inclinometer for use in generally vertical casing having four generally vertical straight grooves, disposed at 90° from each other, including in combination:
    a generally tubular housing having two sets of rollers, each set having four rollers each, with each roller in one set spaced from and in line with a roller in the other set and engaging one of said grooves, said housing having normally horizontal platform means,
    a pair of solid-state, direct current, force-balance linear servo-accelerometers, mounted on said platform means and perpendicular to each other in said housing, with their axes of sensitivity normally horizontal and perpendicular to each other, each having a mass that tends to be displaced from a force-balanced position by inclination of its axis away from horizontal and having electrical means for restoring said mass to its force-balanced position and means for signaling the amount of electrical current used to achieve force balance at each instant,
    mean for supplying each said servo-accelerometer with direct current, so that departure from horizontal of its axis of sensitivity is overcome by electrical current supplied to said electrical means, and
    two indicator means outside said housing, each connected electrically to one said means for signaling for indicating the instantaneous amount of the force-balancing electrical current, from which the inclination of each linear servo-accelerometer is determined,
    a third solid-state, direct current, force-balance servo-accelerometer mounted in said housing with its axis of sensitivity perpendicular to the two axes of sensitivity of said pair of linear servo-accelerometers, said third servo-accelerometer having a mass that tends to be displaced from a force-balanced position by inclination of its axis away from vertical and having electrical means for restoring that said mass to its force-balanced position and means for signaling the amount of electrical current used to achieve force balance at each instant, means for supplying said third servo-accelerometer with direct current, so that departure from vertical of its axis of sensitivity is overcome by electrical current supplied to said electrical means, and third indicator means outside said housing and connected to said third accelerometer's means for signaling for indicating the instantaneous amount of the force-balancing electrical current, from which the inclination from vertical of said third servo-accelerometer is determined.

* * * * *